(12) United States Patent
Casino Lorite et al.

(10) Patent No.: US 6,453,781 B1
(45) Date of Patent: Sep. 24, 2002

(54) SYSTEM FOR HOLDING AND TIGHTENING SCREWS

(75) Inventors: Francisco Casino Lorite; Francisco Casino Santiso; Luis Marin Sanchez, all of Cornella (ES)

(73) Assignee: Casino Y Marin Casmar, S.L., Madrid (ES)

( * ) Notice: Subject to any disclaimer, the term of this patent is extended or adjusted under 35 U.S.C. 154(b) by 0 days.

(21) Appl. No.: 09/423,947

(22) PCT Filed: Mar. 15, 1999

(86) PCT No.: PCT/ES99/00062

§ 371 (c)(1),
(2), (4) Date: Jan. 19, 2000

(87) PCT Pub. No.: WO99/47821

PCT Pub. Date: Sep. 23, 1999

(30) Foreign Application Priority Data

Mar. 18, 1998 (WO) .............................. PCT/ES98/00067

(51) Int. Cl.[7] .............................................. B25B 23/00
(52) U.S. Cl. ......................................... 81/460; 411/404
(58) Field of Search ............................. 81/460; 411/404

(56) References Cited

U.S. PATENT DOCUMENTS

| 2,285,462 A | | 6/1942 | Purtell |
| 3,108,623 A | * | 10/1963 | Muenchinger ............ 81/460 X |
| 3,187,790 A | | 6/1965 | Wing |
| 4,464,957 A | | 8/1984 | Gill |
| 5,120,173 A | * | 6/1992 | Grady ........................ 411/404 |

FOREIGN PATENT DOCUMENTS

| GB | 1006509 | 10/1965 |
| GB | 1 486 246 | 9/1977 |

* cited by examiner

Primary Examiner—James G. Smith
(74) Attorney, Agent, or Firm—Merchant & Gould P.C.

(57) ABSTRACT

New system for holding and fastening screws comprising a screw head provided with a mortise hole (1) having a tapered configuration along the screw longitudinal axis, said mortise hole (1) having a number of lugs (2) and the corresponding circular sections (3); and comprising a suitable screwdriver o fastening tool head tip (4) having a definite shape and wings (5), both according to the corresponding number of lugs (2) in order to match said screw head mortise hole (1); and comprising the required punching mortise die tool for the definite conformation of said screw head mortise hole (1) and said screwdriver or fastening tool head tip (4).

5 Claims, 5 Drawing Sheets

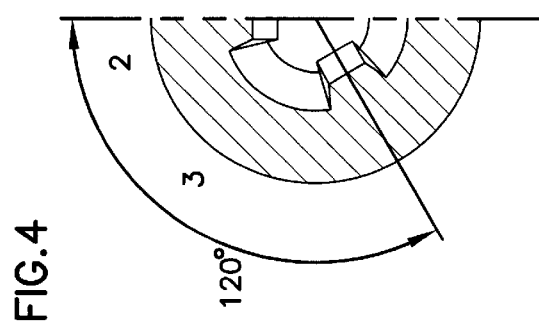
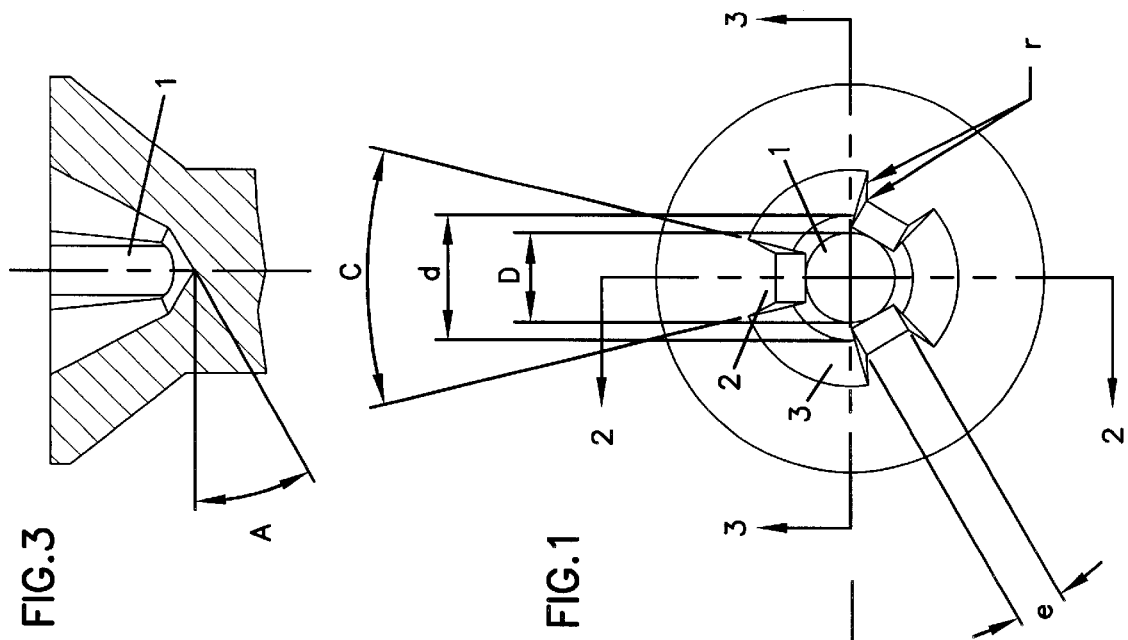
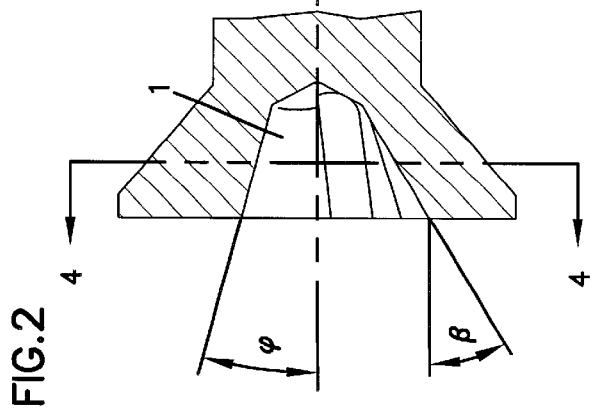

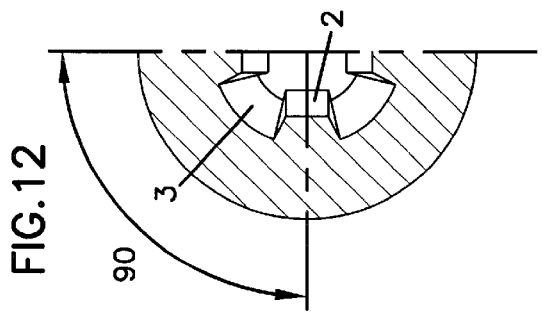
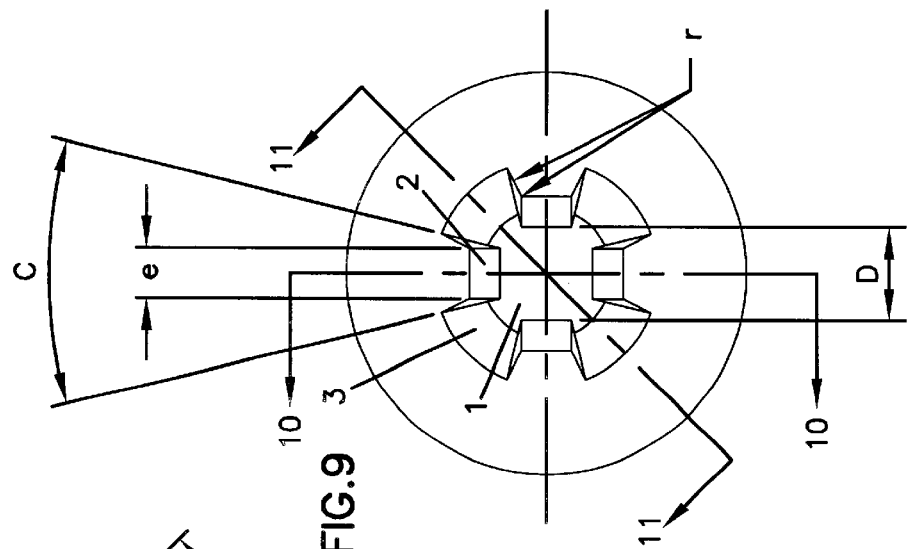
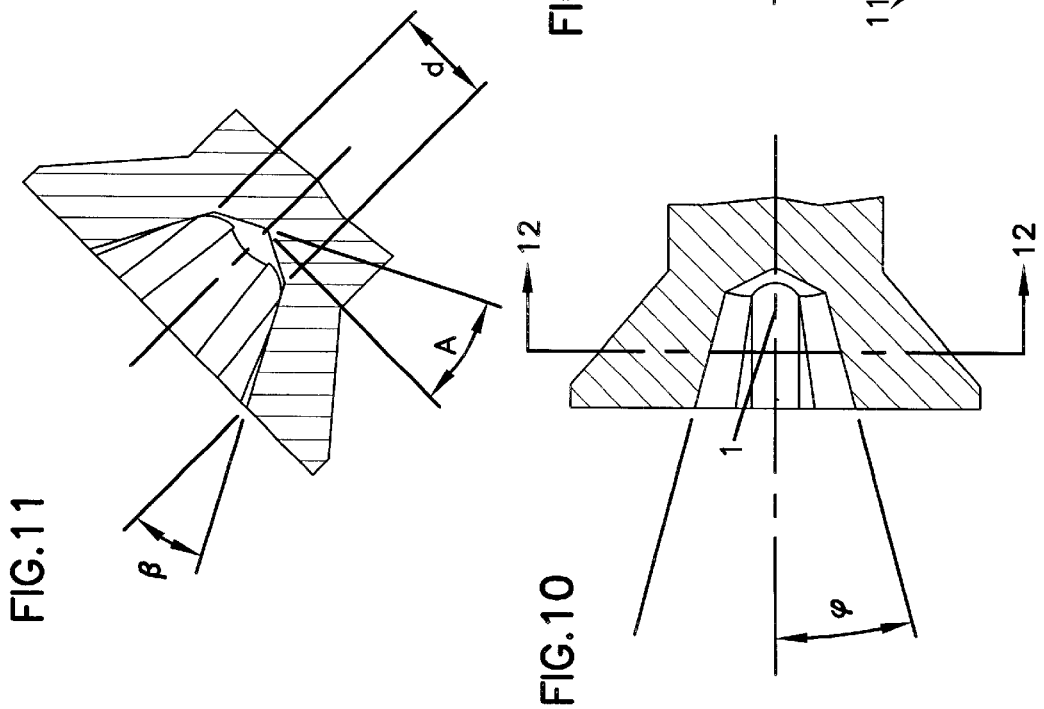

SYSTEM FOR HOLDING AND TIGHTENING SCREWS

The present invention relates to a new system for holding and fastening screws designed to achieve a quick and safety coupling between a screw and a screwdriver or fastening tool, with practically no chance that the screw could be accidentally removed from the screwdriver or fastening tool, as well as for improving the torque transmission without the need of additional efforts for maintaining said coupling, thus making it easy the coupling operations with screws, particulary during automatic assembly operations carried out by means off electrical screwdrivers with torque regulation in the case of robotized machines at industrial facilities, as well as for specific manual applications.

An object of the present invention is a screw head provided with a mortise hole having a tapered configuration and a circular cross section and provided with one or more lugs projected towards the screw longitudinal axis, the circular shaped walls of said mortise hole forming a conicity angle with respect to the screw longitudinal axis, and the screw front lugs walls forming a conicity angle with respect to said longitudinal axis. The specific tapered configuration of the mortise hole shaped in the screw head, in accordance with the screwdriver or fastening tool head tip object of the present invention, represents significant advantages with respect to known to the art systems like: a) a housing produced by the lateral wedge effect of lugs allowing for a reliable gradually increasing pressure coupling between the screw and screwdriver or fastening tool; b) a wider contact surface area between screw head and screwdriver or fastening tool head tip, this improved area contact producing a more uniform distribution of mechanical stresses and lesser wear in the screw head as well as in the screwdriver or fastening tool head tip; c) a saving in cost of material used for the manufacture of the screws as compared with "philips" or "pozidriv" screws of the art; d) providing for a total safety when screwing in and out the screws with no needs for additional efforts thus avoiding errors in the fastening torque; e) a higher efficiency and a longer useful life of the mortise dies and screwdrivers and fastening tools; and, f) easiness for making screw connections in places of difficult access.

A second object of the present invention is a screwdriver or fastening tool head tip with a specific configuration adapted to the screw head mortise hole according to the present invention.

A further object of the present invention is a press die, designed with a specific shape for the cold formation of the screw head mortise hole, and a shaper die for the formation of screwdriver or fastening tool heads tip, objects of the present invention.

As it has been described herein before, the mortise hole made in the screw head has a circular cross section having a number of lugs preferably comprised between two and six, projected towards the screw longitudinal axis. The cross area of said mortise hole decreases gradually downwards along the screw longitudinal axis, the width of lugs also decreasing. The sections of the mortise hole located between each two lugs present a circular form with a predetermined conicity angle, this angle keeping a constant value non-dependant from the number and thickness of said lugs, the front faces of said lugs forming an angle with respect to the screw longitudinal axis, said angle changing in correspondence with the screw nominal diameter, and the side faces of said lugs forming an angle with respect to the screw longitudinal axis.

This special configuration of the screw head of the present invention provides important advantages in comparison with the systems of the state of the art, and therefore the system of the present invention represents a specially novel system for applications in which a safety coupling between screw and screwdriver or fastening tool is required as it is the case of robotized systems or manual applications with a difficult access to the screwed connections.

The Applicant has found that the system for holding and fastening screws of the invention prevents the operator from having to apply an axial force when screwing in the screw of the invention. In manual operations that effort results specially tedious in case of installations of difficult access.

BACKGROUND OF THE INVENTION

The conventional screws known in the art, apart from the head shape and the recesses made in the heads for the insertion of the screwdriver head, have the inconvenience that the screw often get loose this causing a time waste and damages to the said screws.

This problem is more relevant in the case of industrial robotized applications since the screws and the screwing tool are handled by automatic machines so it is essential to have an easy and safety coupling between said screw and tool.

There exist previous attempts related to the present invention. In particular U.S. Pat. No. 2,445,525 discloses a coupling system between screw and screwdriver, the screw head having an axial slot with a number of fins of identical cross area separated by triangular cross spaces, with a screwdrive head matching said screw head; the recess penetrates into the screw threaded body, thus affecting to the mechanical resistance and useful life of the screw; on the other hand, no specific conicity angle values were established, on the contrary said conicity angles being stated in the case of the present invention. U.S. Pat. No. 2,129,440 discloses a coupling system between screw and screwdriver, the screw head having a cross like recess having little depth with interior convex edges, being said recess wide enough as to permit the use of any type of screwdriver, but such recess configuration provides no possibility for having an easy and safety coupling between the screw and screwdriver. U.S. Pat. No. 2,592,462 discloses a coupling system between screw and screwdriver, the screw head also having a wide enough cross like recess adapted to any type of screwdriver, thus having no possibility for an easy and safety coupling between screw and screwdriver.

Therefore, none of the aforementioned patents describes an easy and safety coupling between the screw and screwdriver with the screwdrive head having an specific configuration precisely fitted to a screw head mortise hole, as it is in the case of the present invention.

DESCRIPTION OF THE INVENTION

The system for holding and fastening screws object of the present invention discloses a screw head provided with a mortise hole with a conical tapered configuration along the screw longitudinal axis, said mortise hole having a circular cross section with a number of lugs, preferably comprised between two and six, and preferably of identical size, projecting towards said screw longitudinal axis, said cross section decreasing gradually in the direction of the screw threaded body and accordingly to the conicity angles of the circular cross section and side faces of lugs.

Said mortise hole lugs act by a grip fastening torque provided by means of a contact with the screwdriver or fastening tool head splines for transmitting said fastening torque; said mortise lugs-spline contact providing a significant larger faces contact area thanks to which the mechanical stresses beared by the screw head are considerably smaller than for the known screws of the art.

Furthermore, thanks to the mortise hole punching of the invention, practiced into the screw head, said contact concurrence conicity being produced thus ensuring, by means of the obtained side faces wedge effect, a quick and safety coupling between screw and screwdriver or fastening tool thus with practically no need for exerting any pressure along the screw longitudinal axis, as it normally happens in the case of known screws of the art; and, at the same time, thanks to said coupling safety, the wearings on the screw and screwdriver or fastening tool heads are considerably reduced thus preventing errors for obtaining the predetermined torque.

It is convenient to indicate that for screw heads with mortise holes having four lugs, apart from the specific screwdrivers or fastening tools of the invention, standard "philips" or "pozidriv" type screwdrivers could be used, whereas for a different number of lugs it will be essential to use the screwdriver or fastening tool of the invention.

The Applicant has carried out the corresponding mechanical tests for different number of lugs, for different $\alpha$ conicity angles of said lugs, and for different $\beta$ conicity angles of said circular section, said angles being in correspondance with the practiced depth of the mortise hole of the screw head. Furthermore, all these above-mentioned parameters were related to different screw head outside diameters and their corresponding screw nominal diameters.

Based on the tests carried out by the Applicant, the preferred values for the different parameters which determine the design of the mortise hole of the present invention, practiced on the screw head, have been established as follows:

a) For mortise holes having from two to five lugs, the lug conicity $\alpha$ is comprised at the angle range between 5 to 12.5 degrees, preferably between 7.5 to 11.5 degrees; the circular section conicity $\beta$ is comprised at the range values between 20 to 30 degrees, preferably between 23 to 23.5 degrees; the mortise hole bottom conicity A is comprised at the range between 25 to 35 degrees, preferably between 28 to 29 degrees; the C angle formed by lug side faces is comprised at the range between 15 to 35 degrees, preferably between 30 to 30,5 degrees; the distance D is comprised at the length range between 0.5 mms to 7 mms, preferably between 0.65 mms to 6.5 mms; the distance d is comprised at the range values between 0.8 mms and 9 mms, preferably between 0.9 mms and 8.2 mms; and the distance e is comprised at the range between 0.2 mms to 4 mms, preferably between 0.27 to 4.0 mms.

In no case the depth of the mortise hole should affect the mechanical resistance of the screw.

Another object of the present invention is a screwdriver or fastening tool head tip, having a configuration matching that of the screw head mortise hole of the invention. It is obvious that the undercuttings in said screwdrive or fastening tool head tip must match the lugs of said screw head mortise hole and the wings of said scredriver or fastening tool head tip must match the sections between said two adjacent lugs of the screw head mortise hole.

A further object of the present invention is a punching mortise die for the formation of the mortise hole in the screw head, said punching mortise die being determined by the configuration of the mortise hole of the present invention practiced on the screw head.

DESCRIPTION OF DRAWINGS

In order that this description be concluded and the features of the present invention be more fully comprehended a set of drawings is attached herein with reference to preferred examples of practical embodiments of the present invention, said drawings being disclosed with an explaining and non-limiting purpose; the following figures herein are shown, where:

FIG. 1 shows a plan view of the mortise hole (1) of the invention made in the screw head, for a preferred embodiment comprising three lugs (2) with the corresponding intermediate spaces or circular sections (3);

FIGS. 2 to 4 show cross sections of the screw of the invention exposed on FIG. 1, showing the conicity angles $\alpha$, $\beta$, A and C;

FIG. 9 shows a plan view of the mortise hole (1) made on the screw head of the invention for a preferred embodiment comprising four lugs (2) with the corresponding circular sectons (3).

FIGS. 10 to 12 show the cross sections of the screw head exposed on FIG. 9, showing the conicity angles $\alpha$, $\beta$, A and C;

PREFERRED EMBODIMENTS OF THE INVENTION

Figure 5:
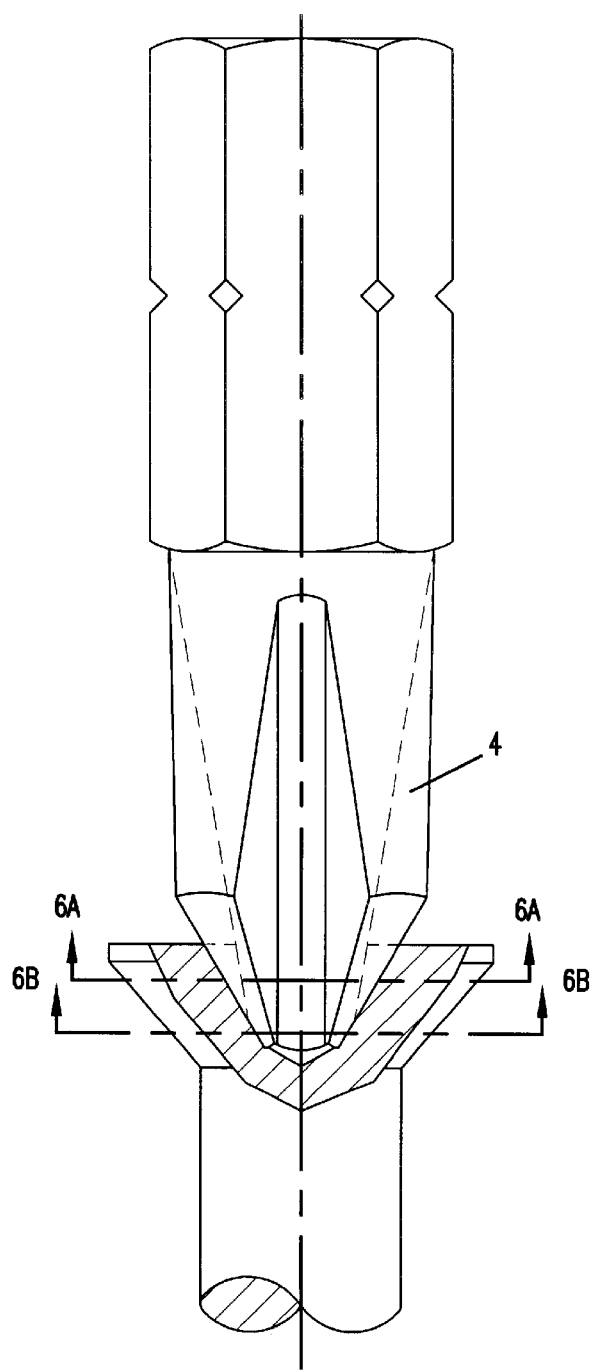
FIG. 5 shows a screwdriver or fastening tool head tip (4) matching the screw head of the invention shown on FIG. 1.
Figure 6A:
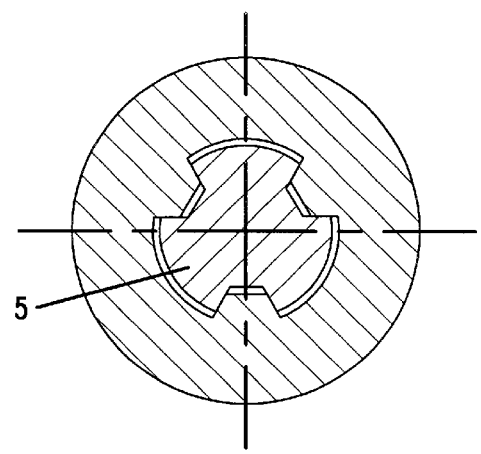
FIG. 6 shows two cross sections of the screwdriver or fastening tool head tip (4) with the corresponding fins (5)
Figure 6B:
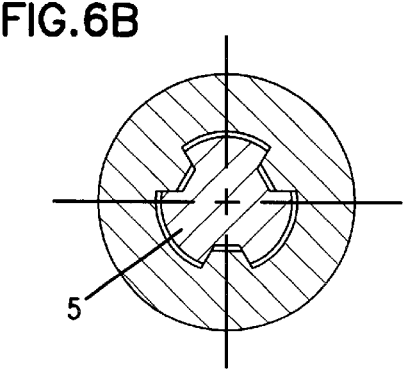
Figure 7:
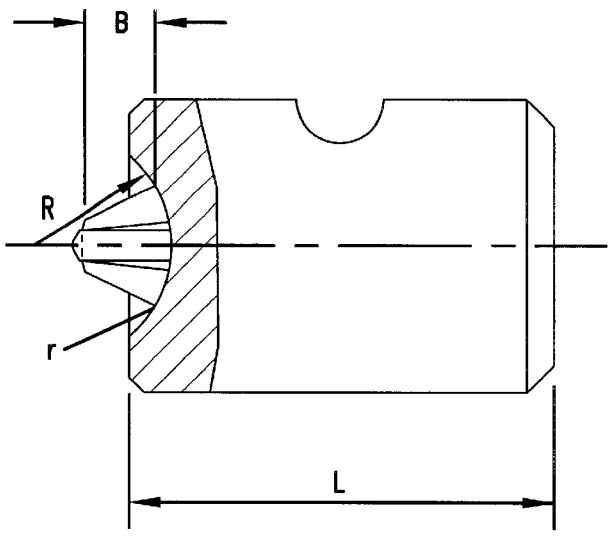
FIGS. 7 and 8 show a punching mortise die for the conformation of the screw head mortise hole shown on FIG. 1.
Figure 8:
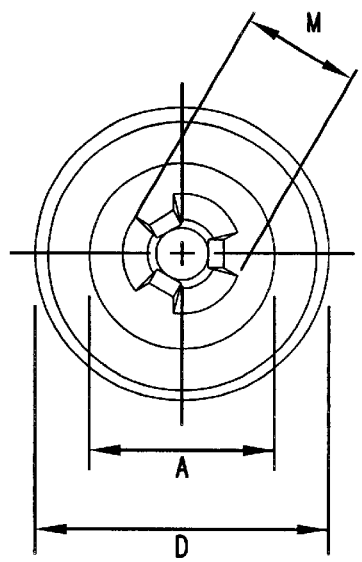

One preferred embodiment of the invention, as shown in FIGS. 1 to 8, relates to the case in which the mortise hole (1) made on the screw head comprises three lugs (2). For this case, the conicity $\alpha$ angle of lugs (2) will be comprised between 7.5 to 7.75 degrees, or 9.5 to 9.75 degrees, or 10.5 to 10.75 degrees depending on the lug (2) type; the conicity $\beta$ angle of circular sections will be comprised between 23 to 23.5 degrees; and the A angle of the mortise hole bottom will be comprised between 28 to 29 degrees. The lug (2) width at decreases towards the screw longitudinal axis proportionally to the corresponding fastening torque each radius point, said width value e varying from 0.4/0.42 mms to 3.05/3.09 mms according to the corresponding lug type. The C angle is comprised between 30 and 30.5 degrees. The distance D varies from 0.65/0.68 mms to 5.85/5.89 mms according to the corresponding lug type. The diameter d varies from 0.9/0.95 to 8.0/8.1 mms according to the corresponding lug type.

Figure 15:
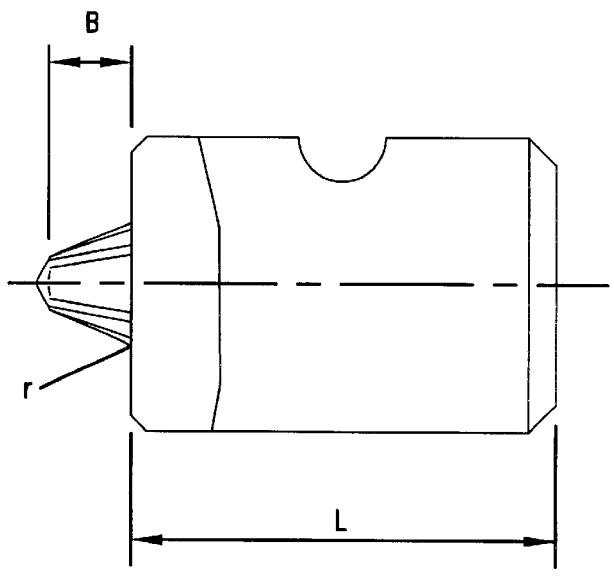
FIGS. 15 and 16 show a punching mortise die for the conformation of the screw head mortise hole of the invention exposed on FIG. 9.
Figure 16:
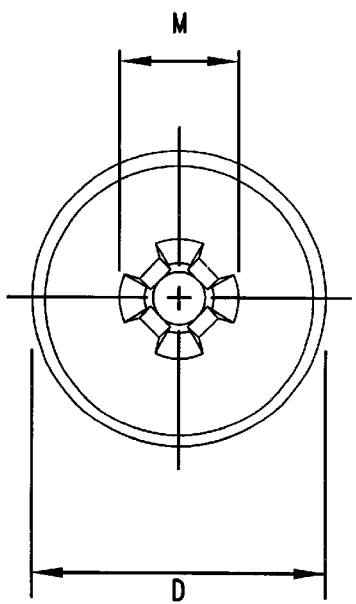
Figure 13:
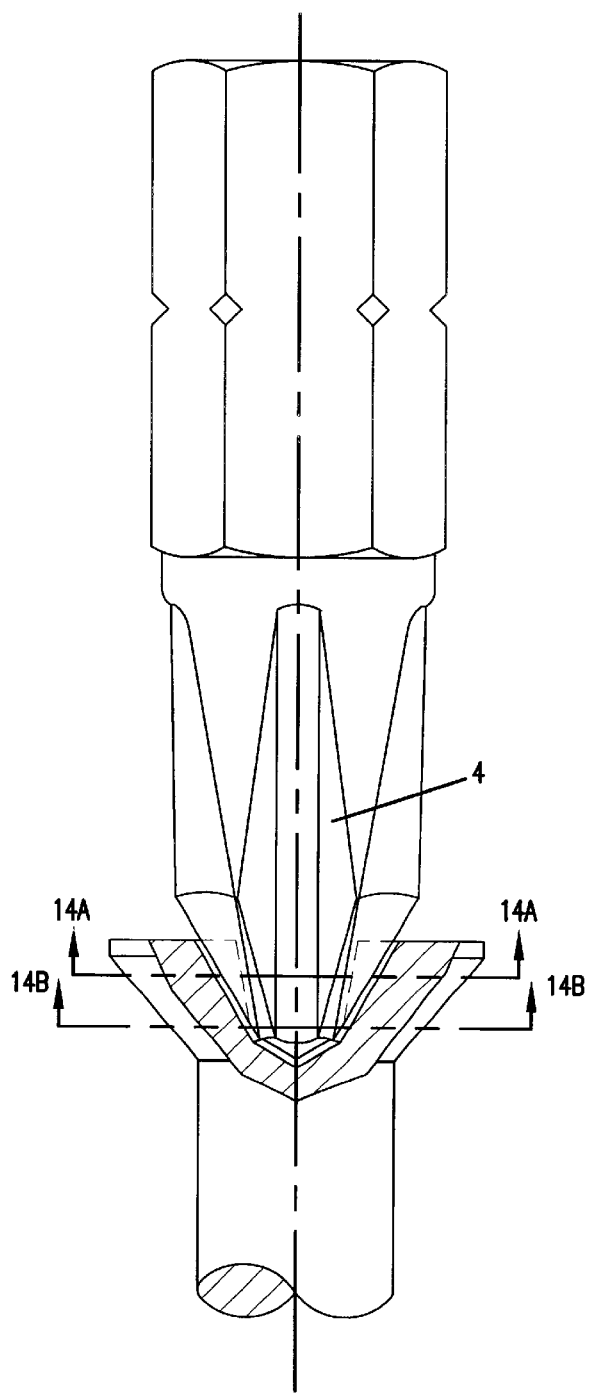
FIG. 13 shows a screwdriver or fastening tool head tip (4), matching the screw head of the invention exposed on FIG. 9.
Figure 14A:
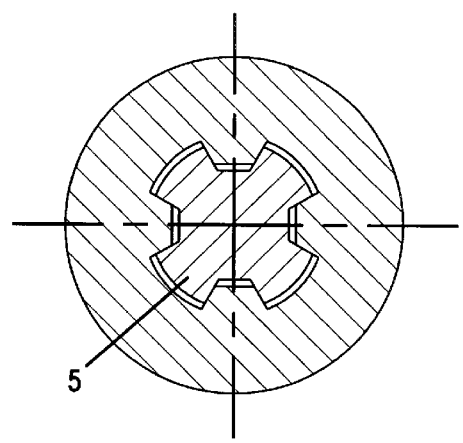
FIG. 14a is a cross section taken along lines 14a—14a of FIG. 13.
Figure 14B:
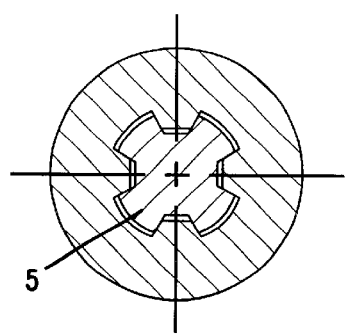
FIG. 14b is a cross section taken along lines 14b—14b of FIG. 13.

Another preferred embodiment of the invention, as shown in FIGS. 9 to 16, corresponds to the case in which the mortise hole (1) practiced on the screw head comprises four lugs (2). For this case, the α, β, A and C angles mantain the same said angles values as those was stated for the precedent embodiment comprising three lugs (2). The lug (2) width decreases towards the screw longitudinal axis proportionally to the corresponding fastening torque at each radius point. The said width value e varies from 0.35/0.37 mms to 2.7/2.74 mms according to the corresponding lug type. The distance D varies from 0.7/0.73 mms to 6.0/6.04 mms according to the corresponding lug type. The diameter d varies from 0.9/0.95 to 8.8/10.0 mms according to the corresponding lug type.

These preferred embodiments are not limitative with respect to the production and use of screw-screwdriver systems and/or the corresponding matching tools for the cases wherein it is convenient to employ a number of lugs below three or above four, as long as the design parameters, in particular the fundamental conicity angles, are maintained, so that the system could operate under the stated conditions of safety and mechanical resistance. In any case, the system of the invention may be modified but keeping the features of the invention as claimed below.

What is claimed is:

1. A system comprising:

a screw comprising a shank and a screw head connected to the shank; and a fastening tool comprising a fastening tool head tip;

wherein the fastening tool head tip comprises a plurality of splines, and the screw head comprises a mortise hole that has a tapered configuration and the screw having a longitudinal axis;

the mortise hole has a circular cross section, and having a plurality of lugs that project toward the longitudinal axis, and having a corresponding number of circular sections between adjacent lugs;

the lugs have a front face having a conicity α that is between 5 and 12.5 degrees, the circular sections having a conicity β that is between 20 and 30 degrees, the lugs having side faces having an angle C that is between 15 and 35 degrees; and a faces wedge effect provides a quick safe coupling between the lugs of the screw head and the splines of the fastening tool.

2. The system of claim 1, wherein the fastening tool comprises a screwdriver.

3. The system of claim 1, wherein the mortise hole and the tool head tip are configured such that only the side faces of said lugs contact said fastening tool head tip when said fastening tool head tip is inserted in said mortise hole.

4. A screw comprising:

a shank;

a screw head connected to the shank, the screw head defining a mortise hole therein, the mortise hole having a tapered configuration and the screw head having a longitudinal axis;

wherein the mortise hole has a circular cross section, and has a plurality of lugs that project toward the longitudinal axis and a corresponding number of circular sections between adjacent lugs;

the lugs having a front face having a conicity α that is between 5 and 12.5 degrees, the circular sections having a conicity β that is between 20 and 30 degrees, the lugs having side faces having an angle C that is between 15 and 35 degrees.

5. A fastening tool, comprising:

a fastening tool head tip defining a longitudinal axis therethrough;

the head tip having a plurality of splines distributed about the longitudinal axis, the splines having an outer face with a cross section in the shape of a circular section, the outer face of the splines having a conicity β that is between 20 and 30 degrees; the splines having side faces forming an angle C that is between 15 and 35 degrees;

the head tip further defining an equal plurality of undercuttings intermediate with the splines, the recesses having a conicity α that is between 5 and 12.5 degrees.

* * * * *